April 20, 1937.    M. A. LISSMAN    2,077,427
GAS SCRUBBER
Filed July 14, 1934    4 Sheets-Sheet 3
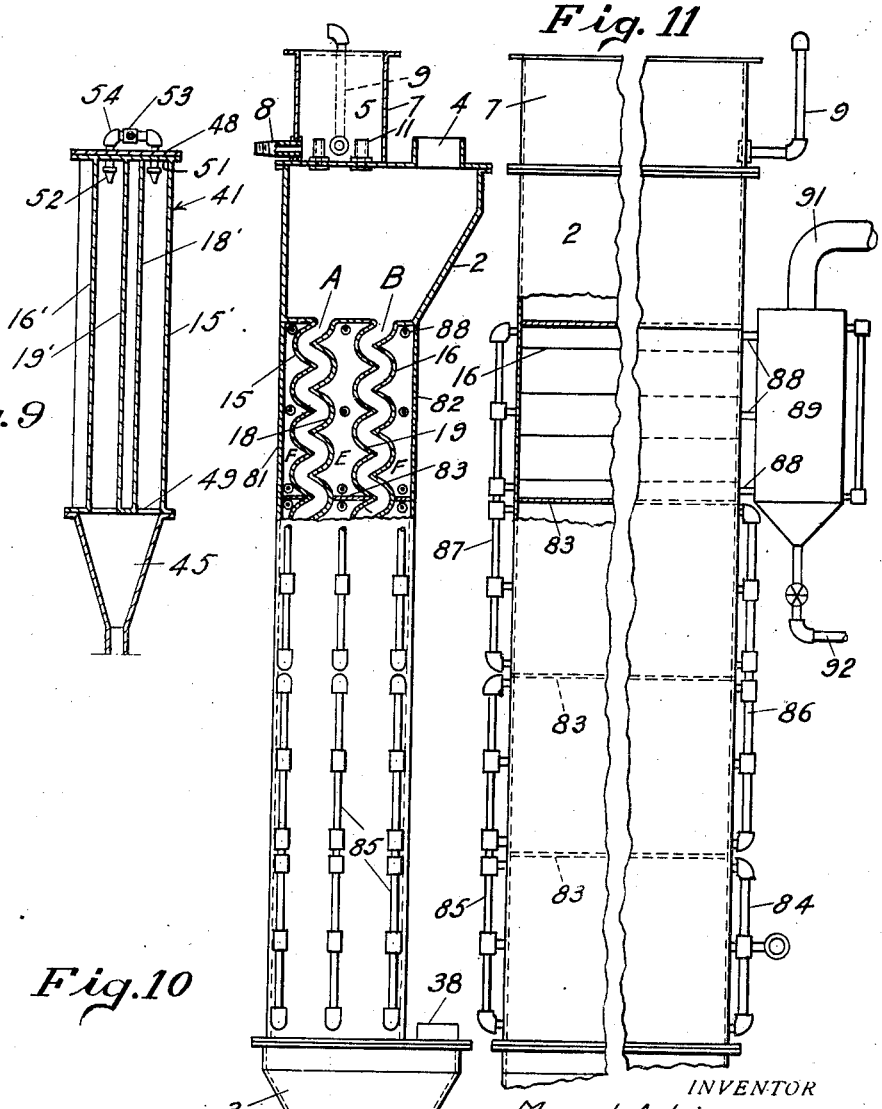

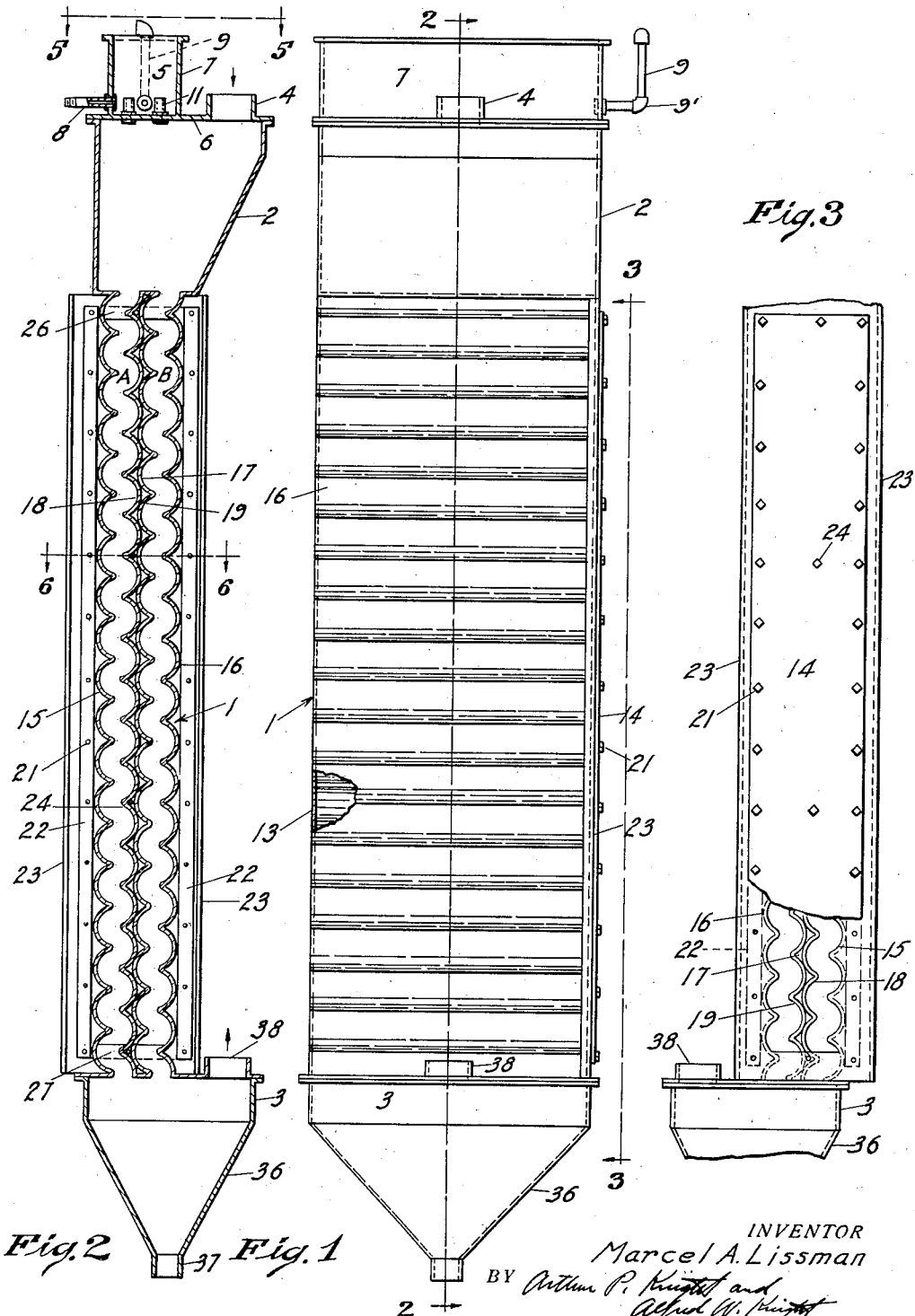

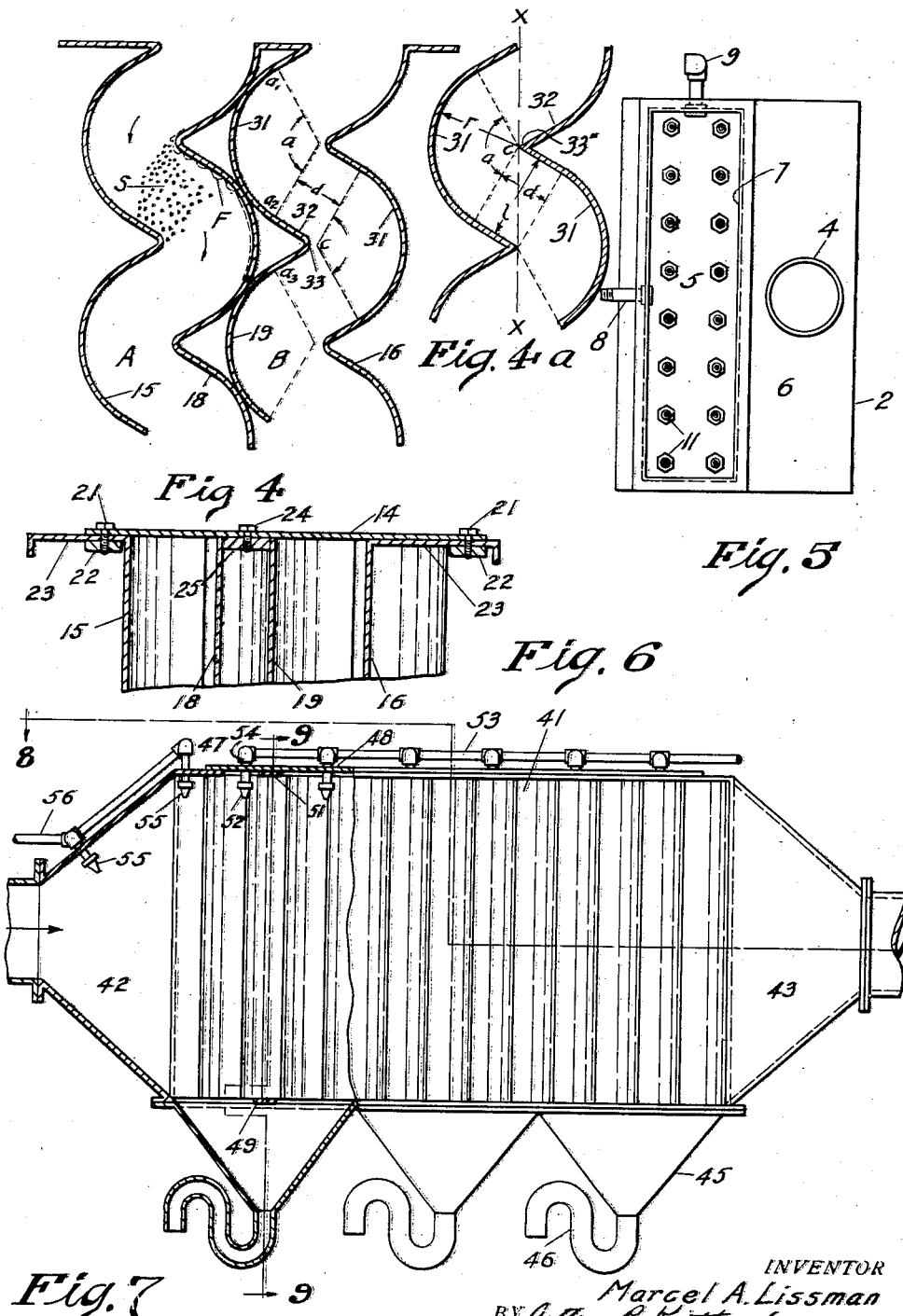

Patented Apr. 20, 1937

2,077,427

UNITED STATES PATENT OFFICE 2,077,427

GAS SCRUBBER

Marcel A. Lissman, Middlesex, N. J., assignor to International Precipitation Company, Los Angeles, Calif., a corporation of California Application July 14, 1934, Serial No. 735,222

6 Claims. (Cl. 261—112)

This invention relates to gas scrubbing apparatus, and particularly to an apparatus for removing fine suspended particles from a gas stream by scrubbing the gas with a liquid. The apparatus may also be used, however, for other purposes in which intimate contact between a gas and a liquid is desired, such as for the removal of a gaseous constituent from a gas stream by scrubbing the gas with a liquid capable of dissolving or absorbing said constituent.

The principal object of the invention is to provide a highly efficient gas scrubbing apparatus, in which a gas stream is brought into very effective and intimate contact with a liquid, and in which a relatively low expenditure of energy is required for passing the gas through the apparatus.

A particular object of the invention is to cause fine suspended particles suspended in a gas stream to come into intimate contact with a scrubbing liquid, whereby such particles are caused to enter the liquid without requiring an excessive draft loss for moving the gas stream through the apparatus or an excessive expenditure of energy for supplying the scrubbing liquid.

A further object of the invention is to provide a scrubbing apparatus in which different portions of a gas stream are continually brought into contact with a scrubbing liquid, so that an efficient scrubbing action on the entire gas stream may be obtained.

A further object of the invention is to provide a scrubbing apparatus in which a high degree of localized eddying action is obtained in the portions of the gas stream adjacent the scrubbing liquid, for the purpose of constantly renewing the gas film in contact with the surface of the liquid and thus increasing the removal of suspended particles or of soluble gaseous constituents, while major eddy currents taking place at points removed from the surface of the scrubbing liquid are minimized, since such major eddy currents are of relatively little importance in promoting the scrubbing action and are detrimental in increasing the draft loss required to force the gas through the apparatus.

A further object of the invention is to provide a scrubbing apparatus in which an effective and uniform distribution of the scrubbing liquid in position for contact with the gas stream is obtained. A particular object in this connection is to provide an apparatus in which the distribution and movement of the scrubbing liquid is effected largely by the action of the gas stream itself.

A further object of the invention is to provide, in certain cases, for controlling the temperature of the scrubbing liquid and the gas being treated, and particularly for the circulation of a cooling medium in contact with the walls of the scrubber but out of direct contact with the gas and the scrubbing liquid. Cooling of the contact surfaces of the scrubber in this manner may be utilized for the purpose of preventing evaporation of the scrubbing liquid and thus reducing the total amount of such liquid required, or for the purpose of cooling the gas sufficiently to cause condensation of water vapor which may be already present therein or which may have been previously introduced thereto, the water particles formed by this condensation assisting materially in the removal of solid particles, as hereinafter described.

Other objects and advantages of this invention will be referred to hereinafter or will become apparent from the following description.

In order to effectively remove very fine suspended particles from a gas stream by scrubbing with a liquid, it is necessary to obtain intimate contact between the gas and the liquid because, for very fine particles, the inertia forces acting on the particles are small compared with the surface forces due to friction resulting from the relative velocity of the gas and suspended particles, and the particles tend to follow closely the stream lines of the gas, the relative velocities between the gas and the suspended particles being very small.

It has been found difficult to obtain an efficient removal of very fine suspended particles from gas by introducing a liquid in the form of a spray. If a gas stream containing fine particles is sprayed with liquid in the form of coarse droplets, then the particles are deflected by the relatively large liquid droplets, along with the displaced gas, and the efficiency of contact and removal is low. In a coarse spray, the number of spray droplets is exceedingly small compared to the number of suspended particles, and the proportion of the gas stream which comes into contact with the surface of the droplets is a very small proportion of the total gas stream, for any amount of spraying which can be economically provided. It is only those particles which are contained in the portions of the gas stream intimately contacting the surfaces of the liquid droplets, which have a chance to be removed. Intimate contact between liquid and gas is enhanced by increasing the relative velocities between the liquid and gas, as such high relative velocities create a zone of strong eddies in the gas stream adjacent the liquid surface, due to the high rate of shear in the gas stream caused by the velocity gradient. These eddies constantly renew the gas film in contact with the liquid surface, thus increasing the possibility of removing the suspended particles. High relative velocities between gas and liquid can not be readily obtained by sprays, because in order to obtain a sufficiently large liquid surface with an expenditure of liquid which can be economically achieved, it is necessary to spray the liquid in the form of such small droplets that they are entrained by the gas stream, so that the relative velocity between the gas and the liquid droplets is quite low.

In the apparatus of the present invention, therefore, the contact of the gas and/or fine suspended particles with the scrubbing liquid is obtained principally by causing the gas stream to move at high velocity in a curved path, in contact with a liquid surface maintained at the outer boundary of said path, whereby strong localized eddies are produced in the portion of the gas stream adjacent the liquid surface, and the radial acceleration of the gas and/or suspended particles also tends to force the same into contact with the liquid, resulting in a high degree of contact of the gas and/or suspended particles with the liquid and an effective removal of the suspended particles (or of a soluble gaseous constituent) from the gas stream into the liquid.

In order to bring about an effective contact of the gas and suspended material with a scrubbing liquid flowing over a contact surface, the width of the gas stream must not be too great, and since it is impracticable to provide a narrow continuous curved path of sufficient length to effect complete scrubbing, the apparatus of this invention is so designed as to cause the gas stream to pass successively through oppositely curved sections arranged in series and connected by short straight sections so as to provide a continuous gas passage, and a scrubbing liquid is caused to flow over the contact surfaces which define said gas passage. Any desired number of such passages may be arranged in parallel, and each of said passages may be made of any suitable or convenient length in a direction parallel to the axes of the curved sections, and of a sufficient total length in the direction of gas flow to provide the desired amount of scrubbing action.

The construction of the apparatus, and various possible modifications in certain features thereof will be described more fully hereinafter.

The accompanying drawings illustrate forms of apparatus embodying this invention, and referring thereto:

Fig. 1 is a side elevation of a preferred form of scrubbing apparatus;

Fig. 2 is a vertical section on line 2—2 in Fig. 1;

Fig. 3 is an end view of a portion of the apparatus shown in Fig. 1, taken in the direction indicated by the line 3—3, with the end wall partly broken away;

Fig. 4 is a vertical section of a portion of the apparatus, showing more particularly the configuration of the gas passages and contact surfaces;

Fig. 4a is a diagrammatic sectional view showing the theoretical or ideal configuration of the gas passages and contact surfaces, which is closely approximated in the practical embodiment shown in Fig 4;

Fig. 5 is a plan view on line 5—5 in Fig. 2;

Fig. 6 is a partial horizontal section on line 6—6 in Fig. 2;

Fig. 7 is a longitudinal vertical section of a modified form of apparatus;

Fig. 8 is a horizontal section on line 8—8 in Fig. 7;

Fig. 9 is a transverse vertical section on line 9—9 in Fig. 7;

Fig. 10 is a partly sectional end view of a form of apparatus provided with means for circulating a temperature controlling medium in contact with the scrubbing walls;

Fig. 11 is a partly sectional side elevation of the form of apparatus shown in Fig. 10;

Figures 12, 13:
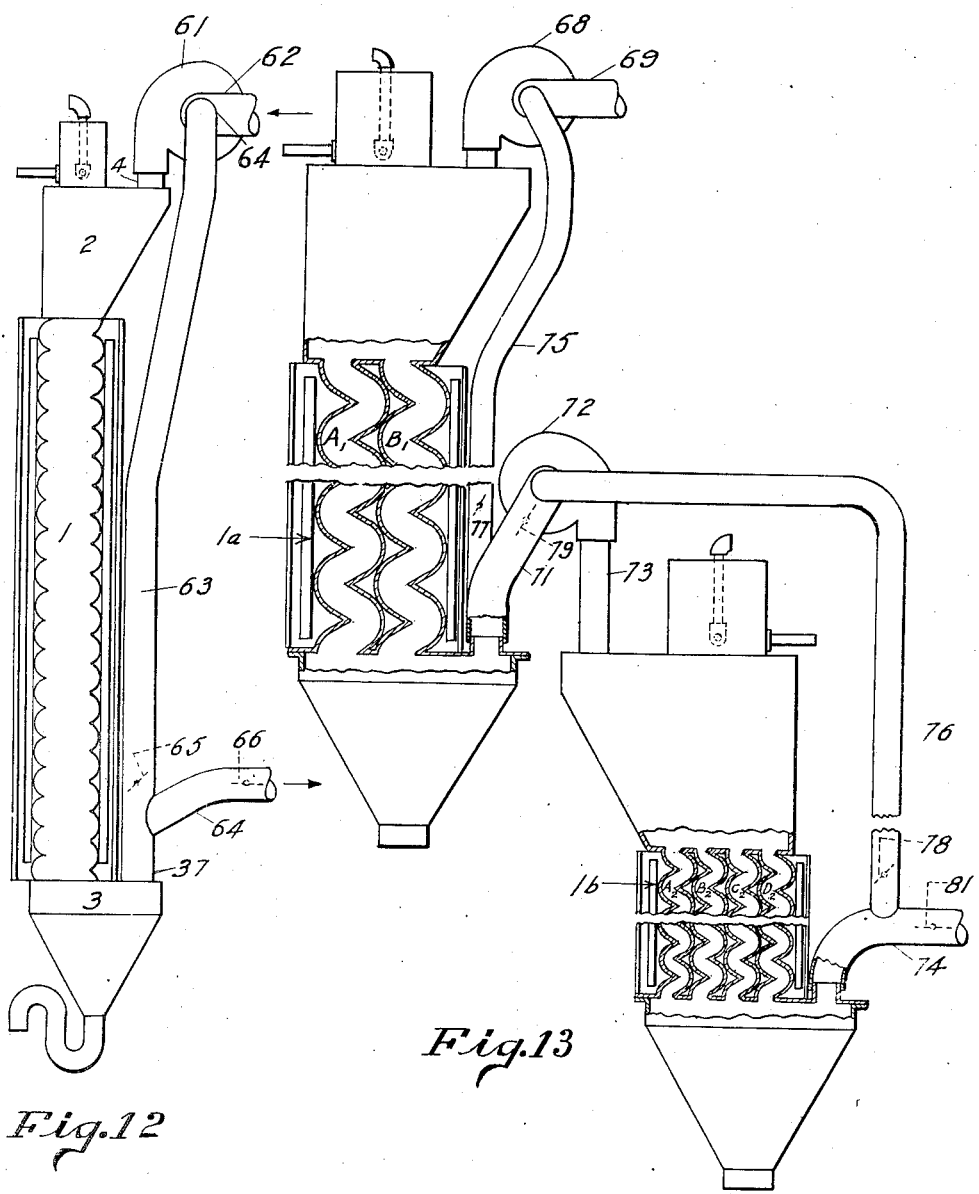
Fig. 12 is a side elevation of a scrubbing apparatus of the type shown in Figs. 1 and 2, provided with means for effecting recirculation of gas therethrough.
Fig. 13 is a partly sectional side elevation of a form of scrubbing apparatus consisting of two sections connected in series, with gas passages of different width in the respective sections.

The preferred form of apparatus shown in Figs. 1 to 6 inclusive comprises a vertically elongated scrubber housing 1 communicating at its upper end with a gas inlet header 2 and at its lower end with a gas outlet header 3. The inlet header 2 is provided with a gas inlet opening 4 which may be connected to any suitable flue or other apparatus for supplying the gas to be treated, and is also provided with liquid supply means 5 shown as mounted upon the top wall 6 of said header.

Said liquid supply means comprises a liquid chamber or reservoir 7 provided with liquid inlet pipe 8 and outlet pipe 9, and a plurality of distributing pipes or orifices 11 extending through the top wall 6 of the inlet header. Said distributing pipes are shown as arranged in two longitudinal rows extending substantially directly above the two scrubbing passages hereinafter described, and each of said rows preferably comprises a plurality of pipes disposed at suitable intervals along the length thereof, in order to provide a sufficiently uniform distribution of liquid along the horizontal length of the scrubbing passages. Suitable means are provided for controlling the liquid level in chamber 7 and thus regulating the rate of flow of liquid through the distributing pipes 11. For example, the liquid outlet pipe 9 may be provided with an elbow connection 9', whereby it may be swung to different positions to vary the height of the upper end thereof through which the liquid continually overflows.

The scrubber housing 1 is shown as comprising end walls 13 and 14, side walls 15 and 16, and an intermediate wall 17 serving to divide the interior of said housing into two parallel vertically extending scrubbing passages A and B. The intermediate wall 17 is shown as comprising two wall members 18 and 19 disposed in contact with one another, but it will be understood that said intermediate wall may, if desired, be formed as a unitary solid member, this latter construction being particularly applicable in case the apparatus is fabricated of material other than metal, such as ceramic or masonry material. It will also be understood that any desired number of intermediate walls may be provided, so as to divide the interior of the housing into any desired number of gas passages.

One of the end walls, such as 14, is preferably removably mounted, as shown particularly in Fig. 6. Said end wall 14 is shown as secured by means of bolts or the like 21 to mounting strips 22 which are rigidly connected to end flanges 23 on the side walls 15 and 16 and, in order to maintain said end wall in close engagement with the ends of the intermediate wall members 18 and 19, I also prefer to secure the same by means of bolts 24 to mounting members 25 rigidly secured at suitable positions between said intermediate wall members. The end wall member 14 is shown as extending throughout substantially the entire height of the scrubbing housing, with the upper and lower ends thereof overlapping rigidly secured end plates 26 and 27 which extend respectively a short distance downwardly from the upper end of the housing and upwardly from the lower end thereof, so that when said wall 14 is secured in position the housing is completely inclosed, and when it is removed the entire interior of the housing is accessible for cleaning or inspection.

Each of the opposing wall surfaces of the gas passages A and B is shown as comprising alternately disposed arcuate or curved concave or reentrant portions 31 and angular convex or projecting portions 32. The straight sides of the angular portions 32 are joined tangentially to the extremities of the adjacent curved portions, as shown for example at $a_1$, $a_2$, and $a_3$. The opposing wall surfaces are assembled with the angular projecting portions 32 directly opposite the curved reentrant portions of the opposing surface, and the apex 33 of each angular portion is located adjacent the axis of curvature $c$ of the opposing curved portion, so that the straight sides of adjacent angular portions of the opposing surfaces extend parallel to and opposite one another for an appreciable distance, thus defining straight gas passage sections having approximately the length indicated at $d$, which are interposed between and connect the arcuate gas passage sections having the angular length indicated at $a$. The angle $a$ may be of any desired extent, and in the construction shown it is approximately 120°.

The ideal or theoretical configuration of the gas passages and wall surfaces is illustrated diagrammatically in Fig. 4a, in which the apex 33″ of each of the angular portions 32 is shown as coinciding with the axis of curvature $c$ of the opposing curved portion 31, at the longitudinal median line $x$—$x$ of the gas passage, in which event the straight gas passage section is of the full length indicated at D. In actual practice, however, I prefer to form the walls 15, 16, 18, and 19 of sheet metal bent or formed into the desired shape, and I find it advantageous to slightly round the apex of each of the angular portions thereof to provide a short convex curved portion as shown at 33 in Fig. 4, so that said rounded apex is slightly displaced from the axis of curvature $c$, and the actual length of the straight gas passage between the opposing straight side portions is somewhat less than the length shown at $d$. This, however, does not materially affect the operation, and the gas passage is still composed essentially of alternate arcuate and straight portions of substantially equal and uniform cross-sectional area. The convex curved portion 33 at the apex of each projecting angular wall surface portion 32 is of much less length and smaller radius of curvature than the opposing concave arcuate portion, which causes the liquid film descending over the wall surface to be partly carried forward by the gas, away from the wall surface, due to the relatively sharp curvature at this point, and projected into the gas stream in the form of a spray, as shown at S in Fig. 4.

The gas outlet header 3 is shown as provided with a hopper-shaped bottom 36 for collecting the scrubbing liquid and removed solid particles discharged from the lower ends of the scrubbing passages A and B, said hopper-shaped bottom being provided with outlet means 37 for the discharge of the scrubbing liquid and collected solid material. The outlet header 3 is also provided with gas outlet means 38.

In the operation of the above-described apparatus, water or other scrubbing liquid is continually supplied at a suitable rate through the distributing pipes 11, so as to enter the upper ends of the gas passages A and B and pass downwardly therein, while the gas to be treated, containing suspended solid particles, is also passed downwardly through said passages at suitable velocity. The flow of gas through the apparatus may be maintained in any suitable manner, as for example by means of a fan or blower connected to the inlet means 4 or outlet means 38. The scrubbing liquid tends to flow downwardly along the contact surface provided by the walls 15, 16, 18, and 19, and the friction of the gas stream in contact therewith serves to spread said liquid over these contact surfaces in a thin uniformly distributed film. As the gas and liquid pass the apex 33 of each of the angular wall portions 32, a portion of the liquid is drawn or carried away from the wall by the action of the gas stream and the momentum of the flowing liquid and falls, in the form of fine droplets, through the portion of the gas stream immediately below that point, as indicated at S in Fig. 4, while another portion of the liquid passes downwardly in contact with the wall surface immediately below the apex 33 as indicated at F in Fig. 4. Thus, a continuous film of scrubbing liquid is maintained over substantially all portions of the contact surfaces, while portions of the liquid are also repeatedly broken up into fine particles so as to exert a spray washing or scrubbing action on the gas. The scrubbing, however, is principally accomplished by contact of the suspended particles with the film of scrubbing liquid on the contact surfaces. As the gas passes through each of the curved sections of the gas passage, the suspended particles are forced into contact with the film of scrubbing liquid due to radial acceleration of such particles and also by the action of localized eddy currents in the gas stream adjacent the arcuate surface 31, and the particles so impinging upon the liquid film are thus removed from the gas stream.

After passing through a curved gas passage section, the gas then passes through a straight section as shown at $d$, which serves to straighten out the gas stream before it is subjected to circular motion in the reverse direction in the succeeding curved section. The substantially constant cross-section of the gas passage, and the provision of straight gas passage sections between successive curved sections, serve to minimize or prevent the formation of major eddy currents or disturbances in the gas stream, and thus enable the gas to be passed through the apparatus at the desired velocity with a minimum loss of head or pressure drop. Consequently, only a relatively low expenditure of energy is required to force the gas through the scrubber.

By the time the gas stream reaches the lower ends of the respective scrubbing passages, the suspended particles are largely removed therefrom, and the collected impurities together with the scrubbing liquid are collected in the hopper 36, while the clean gas is delivered through outlet means 38.

The form of apparatus shown in Figs. 7 to 9 inclusive operates on similar principles to that above described, but is designed for horizontal rather than vertical gas flow. Since the liquid supplied to the contact surfaces is caused by gravity to move downwardly and transverse to the direction of gas flow, I have in this case shown means for supplying such liquid at suitable intervals along substantially the entire length of the scrubbing passages.

The apparatus is shown as comprising a horizontally elongated scrubber housing 41 provided at one end with a gas inlet chamber 42 and at the other end with a gas outlet chamber 43. The side walls of the scrubber housing are indicated at 15' and 16', and an intermediate wall 17' extends longitudinally within said housing and midway between said side walls. In this case also, the intermediate wall 17' may, if desired, be formed as a unitary solid member, but is preferably formed of two contiguously disposed wall members 18' and 19'. The wall members 15', 16', 18', and 19' are similar in shape and relative disposition to the wall members 15, 16, 18, and 19 above described, but are so disposed as to provide horizontally extending scrubbing passages A' and B' therebetween. In this case, therefore, the apex 33' of each of the projecting angular portions of said wall members, and the axis of curvature of each of the reentrant curved portions 31' extend vertically, it being understood that the specific form and relative disposition of these angular and curved portions are in conformity with the larger scale showing in Fig. 4, so as to provide scrubbing passages A' and B' consisting of alternate straight and arcuate gas passage sections as above described.

One or more hopper-shaped receptacles 45 may be provided at the bottom of the scrubber housing, having suitable outlet means 46 through which the spent scrubbing liquid and collected impurities may be withdrawn without permitting inflow or outflow of gas through said outlet means. The top of the housing may be provided with an opening 47 extending over the top of the scrubbing passages throughout the major portion of the length thereof, said opening being normally closed as by means of a removable cover plate 48 secured to the housing in any suitable manner. The intermediate walls 18' and 19' may be supported and held in proper relative position by means of transverse supporting strips 49 and 51 disposed at suitable intervals along the length of the scrubber housing and secured respectively to the upper and lower ends of said intermediate wall members.

The means for supplying scrubbing liquid is shown as comprising liquid spray heads or nozzles 52 of any suitable type disposed at suitable intervals along the respective scrubbing passages A' and B' and adjacent the upper ends thereof, for supplying said liquid to said passages and upon the contact surfaces of the wall members 15', 16', 18', and 19'. Said liquid spray members are connected to a liquid supply pipe 53 by means of branch connecting pipes 54 extending through the cover plate 48. Also, in order to further assist in the supply of scrubbing liquid to the scrubbing passages and contact surfaces adjacent the inlet end of the apparatus, I have shown additional spray heads or nozzles 55 in the inlet chamber 42, connected to liquid supply means 56.

In the operation of this form of apparatus, the gas passes horizontally through the scrubbing passages A' and B', while the scrubbing liquid is supplied through the spray means 52 and 55. The liquid is preferably introduced in the form of a fine spray, so as to not only exert a spray washing action on the gas but also thoroughly wet the contact surfaces of the walls 15', 16', 18', and 19'. The scrubbing action takes place in substantially the same manner as above described, the scrubbing liquid and removed impurities draining downwardly into the receptacle 45 and being withdrawn through outlet means 46 while the clean gas is withdrawn from the outlet chamber 43.

In Figs. 10 and 11 I have shown a form of apparatus similar to that shown in Figs. 1 to 6, but in which means are provided for passing a fluid temperature control medium in contact with the scrubbing walls but out of contact with the gas stream and the scrubbing liquid. The intermediate scrubbing walls 18 and 19 are shown as separated from one another to provide a space E therebetween, and outer side walls 81 and 82 are provided, spaced from the side walls 15 and 16 to provide spaces shown at F. Means are provided for passing a fluid medium through the spaces E and F, and in order to better distribute the flow of said medium I have shown said spaces as divided into a plurality of superposed chambers, by means of suitably spaced horizontal partitions 83. Fluid supply means 84 are connected to the lowermost of this series of chambers, at one end thereof. From the opposite end of said chamber, pipes 85 lead to the next higher chamber, and the fluid medium is similarly conducted by pipes 86 and 87 to the remaining chambers and finally into one end of the uppermost chamber. Outlet pipes 88 are connected to the other end of this uppermost chamber. In case the process is so carried out as to cause vaporization of a portion of the fluid temperature control medium by heat received through the scrubbing walls, the outlet pipes 88 may be connected to a receiver 89, in which the vapors may be separated from the liquid, said receiver being provided with a vapor outlet 91 and liquid outlet 92.

This form of apparatus is shown as provided with inlet and outlet chambers 2 and 3 of substantially the same construction as in Figs. 1 and 2, and is also shown as provided with liquid supply means 5 for introducing liquid into the gas entering the inlet chamber. In certain cases however, said liquid supply means may be eliminated as hereinafter described.

The operation of this form of apparatus is substantially the same as above-described in connection with Figs. 1 to 6 inclusive, with the exception that a fluid medium at suitable temperature is passed through the several chambers of the spaces E and F in heat interchanging relation with the gas passing through the scrubbing passages A and B. The arrangement shown provides for counter-current flow of the temperature control medium with respect to the treated gas, so as to provide for efficient heat transfer therebetween. The temperature control medium may be either a gas or liquid and may be of either higher or lower temperature than the treated gas passing through the scrubbing passages, so as to provide for either heating or cooling of such gas and the scrubbing liquid.

As a specific example of this use of this form of apparatus, water or other liquid at a lower temperature than the treated gas may be utilized as a temperature control medium, in order to prevent undue heating of the scrubbing liquid in case the treated gas is sufficiently hot to tend to cause evaporation of such liquid. The evaporation of the scrubbing liquid may thus be reduced or prevented, thereby enabling an efficient scrubbing action to be maintained throughout the length of the scrubbing passages without requiring the introduction of an excessive amount of such scrubbing liquid. The cooling of the scrubbing liquid is very efficient, as the heat transfer is from a liquid medium through a metal wall to a liquid film, while the scrubbing liquid is kept in such state of turbulence as to readily extract heat from the treated gas.

In some cases, cooling of the scrubbing walls in the manner above described, and of the gas passing therebetween, may be carried to such an extent as to cause condensation of water vapor or other condensible vapor, which vapor may have been already present in the gas to be treated or may have been supplied thereto as by introduction of steam or water sprays into the gas prior to entering the scrubbing passages. In such cases, condensation will occur on the scrubbing walls, and the gas stream itself may also be cooled sufficiently to cause condensation of liquid on suspended solid particles in said gas stream, which increases the size and weight of the particles and facilitates the separation thereof. The liquid thus condensed will also be carried down through the scrubbing passages and along the scrubbing walls so as to assist in the scrubbing operation, and in some cases this condensation of liquid may be employed as the sole or partial source of scrubbing liquid supplied to the scrubbing surfaces, the supply of liquid through means 5 being either eliminated or correspondingly reduced.

This form of apparatus may also be advantageously used in the carrying out of a process such as described in United States Patent to L. D. Gilbert et al. Number 1,324,737, by passing a hot gas stream containing water vapor or other condensible vapor, and also containing suspended solid particles, through the scrubbing passages A and B to cause condensation of vapor therefrom and also cause collection of solid particles, resulting in the formation of a solution of the removed solid material in the condensed liquid, passing this solution through the spaces E and F and maintaining a vacuum in said spaces, as by the action of a vacuum pump and condenser connected to the outlet pipes 88 and thereby causing concentration of the solution by evaporation of liquid therefrom while at the same time causing said solution to act as a cooling medium for the scrubbing walls and for the gas passing therebetween. Heat is rapidly transferred through the scrubbing walls, from the gas stream to the liquid medium, and this heat transfer not only cools the gas to the desired temperature but also supplies heat to the liquid to cause evaporation thereof.

It will be understood that the provision of means for passing a temperature controlling medium in contact with the scrubbing walls may also be applied to the horizontal gas flow apparatus such as shown in Figs. 7 to 9, and that it may also be used in connection with any of the other modifications of this invention herein described.

In many cases it is found advantageous to return at least a portion of the gas delivered from the scrubber and pass the same again through the scrubbing apparatus. A form of apparatus in which this may readily be accomplished is illustrated in Fig. 12. In this figure I have shown a scrubber of the type shown in Figs. 1 to 6, comprising scrubber housing 1, inlet chamber 2 and outlet chamber 3, it being understood that the scrubber housing is provided with walls defining one or more scrubbing passages of the type shown in Fig. 1. A fan or blower 61 is connected to receive gas from a flue 62 and deliver the same to the gas inlet means 4 of the scrubber. A gas return flue 63 leads from the gas outlet means 37 to the inlet side of the fan 61, said return flue being shown as communicating at 64 with the main supply flue 62 adjacent the inlet of said fan. A main gas outlet or delivery flue 65 is also provided, which may be connected, as shown, to the return flue 63 or may be separately connected to the outlet chamber 3. A damper 65 may be provided in the return flue 63 for regulating the amount of gas returned therethrough, or for completely shutting off flow of gas therethrough, and if desired, a damper 66 may also be provided in the main outlet flue 64.

It will be obvious that, by suitable regulation of dampers 65 and 66, any desired proportion of the gas from outlet chamber 3 may be returned, mixed with the untreated gas supplied through flue 62, and again passed through the scrubbing apparatus. This not only provides for repeated scrubbing of the gas so as to more completely eliminate suspended particles therefrom, but may also be used as a means of increasing the volumetric rate of flow of gas through the scrubber, and hence increasing the velocity of the gas passing through the scrubbing passages.

It has been found that, throughout at least a considerable range of gas velocities, the efficiency of scrubbing as determined by the percentage of suspended material removed, is materially increased with an increase of velocity, and it has also been found that, when treating a certain volume of gas in a scrubbing apparatus of given size, the efficiency of collection may be materially increased by increasing the percentage of gas recirculated. For example, a series of tests were made on an apparatus of this type, with varying percentages of recirculation, and the results of these tests are given below. The first column shows the percentage which the volume of recirculated gas bears to the total volume of gas passing through the scrubbing apparatus, the second column the draft loss from the scrubber inlet to the scrubber outlet, in inches of water, and the third column the percentage efficiency of removal of suspended material.

| Recirculation | Draft loss | Efficiency |
| --- | --- | --- |
| Percent | | Percent |
| 0 | 3.12" | 82.3 |
| 20 | 4" (approx.) | 89.2 |
| 42 | 5.75" | 93.2 |
| 50 | 8" (approx.) | 95.6 |

In cases where a scrubbing apparatus of a given size is used for the treatment of a gas stream which is subject to considerable variation in volumetric rate of flow from time to time, the provision of means for recirculating any desired portion of the gas through the apparatus, as shown in Fig. 12, may be advantageously utilized to maintain a substantially uniform collection efficiency regardless of such variations in rate of gas flow. It will be apparent that, by varying the percentage of gas returned through flue 63 in accordance with variations in the rate of supply of gas through the main inlet flue 62, the total volume of gas passed through the scrubbing apparatus may be maintained substantially constant, thus providing a uniform velocity of gas flow therethrough and a relatively uniform efficiency of collection of suspended material. It will also be apparent that the desired control of the percentage of gas recirculated may be obtained by regulation of damper 65, either manually or automatically. For example, automatic damper regulating means of any suitable type may be provided for adjusting the position of said damper in accordance with variations in the pressure drop between the scrubber inlet and the scrubber outlet.

In Fig. 13 I have shown an apparatus consisting of two scrubber units 1a and 1b connected in series. Each of these units may be of substantially the same construction as shown in Figs. 1 to 6 inclusive, but the first scrubbing unit 1a is shown as provided with scrubbing passages $A_1$ and $B_1$ of relatively large width in a direction perpendicular to the axes of curvature of the curved sections thereof, while the second unit 1b is shown as provided with scrubbing passages $A_2$, $B_2$, $C_2$, and $D_2$ of smaller width in said direction. It will be understood that the shape and relative disposition of the passages and contact surfaces of each of said units are substantially as shown in Fig. 4 or Fig. 4a. In order that the two scrubbing units may be capable of handling a given volume of gas with approximately the same velocity of gas flow therethrough, I prefer to provide the second unit with a greater number of gas passages than the first unit. For example, I have shown the second unit as having passages whose width is approximately one-half that of the passages in the first unit, while the number of passages in the second unit is twice as great as in the first unit, so that if a given volume of gas is passed successively through the two units, with no recirculation in either unit or with the same percentage recirculation in each unit, the gas velocity in both units will be substantially the same.

The gas may be delivered to the first unit 1a by means of a fan or blower 68 whose inlet is connected to the main gas supply flue 69. The outlet flue 71 from the first unit leads to a fan or blower 72 whose outlet is connected by flue 73 to the inlet end of the second unit 1b, while a main outlet flue 74 leads from the outlet end of the second unit.

If desired, means may also be provided in this case for effecting recirculation of part of the gas through the scrubbing apparatus. This may be accomplished, for example, by providing a return flue connection from the main outlet flue 74 to the inlet side of the first fan 68, in a manner similar to that shown in Fig. 12, so as to recirculate part of the gas through the two-unit system as a whole, but I prefer to provide means for separately recirculating gas through the respective units. In Fig. 13, therefore, I have shown a recirculation flue 75 leading from the outlet of the first unit 1a to the inlet side of fan 68, and a recirculation flue 76 leading from the outlet of the second unit 1b to the inlet of fan 72. These recirculation flues may be provided with dampers 77 and 78 respectively, for controlling the percentage of gas recirculated through each scrubbing unit. Additional dampers may also be provided at any suitable positions in the system, and I have shown for example a damper 79 in flue 71 and a damper 81 in the main outlet flue 74.

It will be understood, of course, that the features illustrated in Figs. 12 and 13, namely, the provision of means for recirculating any desired proportion of the gas stream through the scrubbing apparatus, and the provision of two or more scrubbing units in series, having scrubbing passages of successively decreasing width in the respective units, may be applied equally well to a scrubbing apparatus of the horizontal gas flow type such as shown in Figs. 7 to 9 inclusive, and it will also be understood that numerous modifications or variations may be made in the specific construction of any of the types of scrubbing apparatus herein shown, without departing from the spirit of this invention as defined in the appended claims.

It will be observed that, in each of the forms of apparatus above described, means are shown for mechanically supplying a scrubbing liquid into the gas and upon the scrubbing surfaces. However, in describing the operation of Figs. 10 and 11, it was pointed out that in some cases the supply of scrubbing liquid can be obtained partially or entirely by cooling the scrubbing surfaces and the gas sufficiently to cause condensation of vapor from the gas stream, and that this means of supplying liquid may also be used in connection with any of the other forms of scrubbing apparatus disclosed. If the liquid thus condensed is alone sufficient to cause the desired scrubbing action to be obtained, then the means for mechanical supply of liquid may be eliminated, and it will be understood that the expression "means for supplying liquid" as used in the appended claims is intended to include means for mechanically supplying liquid, or means for supplying liquid by condensation of vapor from the gas stream, or both.

I claim:

1. A gas scrubbing apparatus comprising two scrubber units, means connecting said units for passage of gas therethrough in series, each of said scrubber units comprising a plurality of spaced walls provided with opposing contact surfaces defining therebetween one or more gas passages each having alternate arcuate and straight sections, said straight sections being tangent to the adjacent arcuate sections and each arcuate section being curved in a reverse direction to the next preceding arcuate section, said gas passages being so disposed in the respective units as to provide for flow of gas therethrough in a direction substantially perpendicular to the axes of curvature of said arcuate sections, each gas passage in the first scrubber unit being of greater transverse width in a direction perpendicular to said axes of curvature than each gas passage of the second scrubber unit, and means for supplying liquid to the gas passages and upon the contact surfaces of each of said scrubber units.

2. In a gas scrubbing apparatus, two spaced walls provided with opposing contact surfaces defining therebetween a gas passage having alternate arcuate and straight sections, said straight sections being tangent to the adjacent arcuate sections and each of said arcuate sections being curved in a reverse direction to the next preceding arcuate section, means for passing gas through said gas passage in a direction substantially perpendicular to the axes of curvature of said arcuate sections, and means for passing a fluid temperature control medium in contact with said spaced walls at the opposite side of said walls from said gas passage.

3. In a gas scrubbing apparatus, a plurality of spaced walls provided with opposing contact surfaces defining a plurality of gas passages each having alternate arcuate and straight sections, said straight sections being tangent to the adjacent arcuate sections and each of said arcuate sections being curved in a reverse direction to the next preceding arcuate section, gas inlet means communicating with said gas passages at one end thereof, gas outlet means communicating with said gas passages at the other end thereof, housing means surrounding said spaced walls and providing an enclosed space extending between said spaced walls and separated from said gas passages, and means for passing a fluid temperature control medium through said enclosed space and in contact with said spaced walls.

4. In a gas scrubbing apparatus, a plurality of spaced walls defining therebetween a plurality of gas passages, each intermediate wall having two contact surfaces facing toward the gas passages at the respective sides thereof and each comprising alternately disposed concave arcuate portions and projecting angular portions, each of said concave arcuate portions being curved through an angle in excess of 90 degrees, each of said projecting angular portions being joined substantially tangentially to each adjacent arcuate portion and having an apex portion extending substantially parallel to and adjacent the axis of curvature of a concave arcuate portion of the opposing contact surface of an adjacent wall, each of said apex portions being slightly rounded and having a much smaller radius of curvature than said concave arcuate portions, the projecting angular portions of each contact surface of each intermediate wall being disposed opposite the concave arcuate portions of the other contact surface of that wall, means for passing gas through said gas passages in a direction substantially perpendicular to the axes of curvature of said arcuate portions, and means for supplying liquid to said gas passages and upon said contact surfaces.

5. A gas scrubbing apparatus comprising two spaced walls provided with opposing contact surfaces, each of said contact surfaces comprising alternate concave arcuate portions and projecting angular portions, each of said arcuate portions being curved through an angle in excess of 90 degrees and each of said projecting angular portions having two straight sides joined tangentially to the adjacent arcuate portions and connected by a rounded apex portion of materially less length and smaller radius of curvature than said concave arcuate portions, said walls being so positioned that the rounded apex of each projecting angular portion of each contact surface is located adjacent the axis of curvature of a concave arcuate portion of the opposing contact surfaces, means for supplying liquid to said gas passage and upon said contact surfaces, and means for passing gas through said passage in a direction substantially perpendicular to the axes of curvature of said arcuate portions.

6. In a gas scrubbing apparatus, a plurality of spaced walls defining therebetween a plurality of gas passages, each intermediate wall having two contact surfaces facing toward the gas passages at the respective sides thereof and each of said surfaces comprising alternately disposed concave arcuate portions and projecting angular portions, each of said concave arcuate portions being curved through an angle in excess of 90 degrees, and each of said projecting angular portions having straight side walls joined substantially tangentially to the adjacent arcuate portions, the projecting angular portions of each contact surface of each intermediate wall being disposed opposite the concave arcuate portions of the other contact surface of that wall, and the apex of each projecting angular portion extending parallel to and adjacent the axis of curvature of a concave arcuate portion of the opposing contact surface of an adjacent wall, means for passing gas through said passages in a direction substantially perpendicular to the axes of curvature of said concave arcuate portions, and means for supplying liquid to said gas passages and upon said contact surfaces.

MARCEL A. LISSMAN.